W. F. FOLMER.
PHOTOGRAPHIC ROLL HOLDER.
APPLICATION FILED DEC. 30, 1915.
1,187,895.
Patented June 20, 1916.
3 SHEETS—SHEET 1.
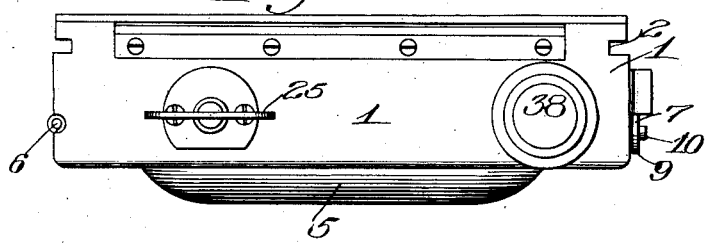
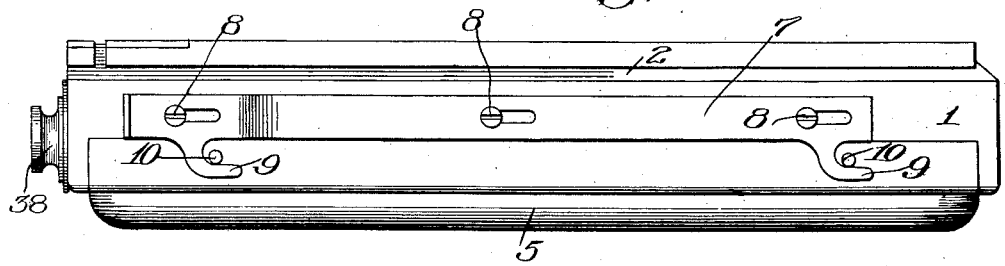
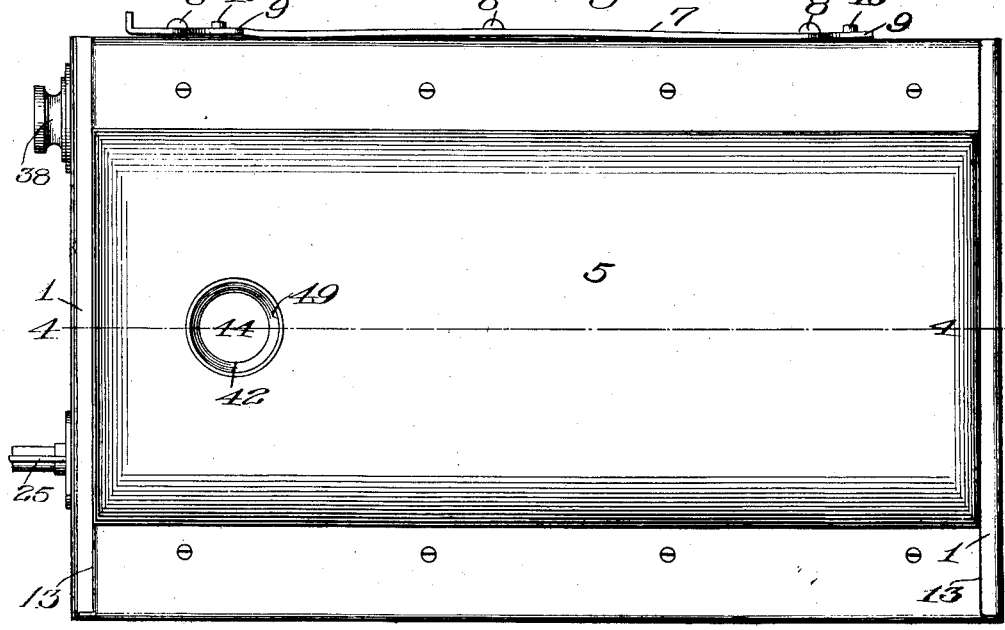
WITNESSES:
INVENTOR.
William F. Folmer
BY
his ATTORNEYS.

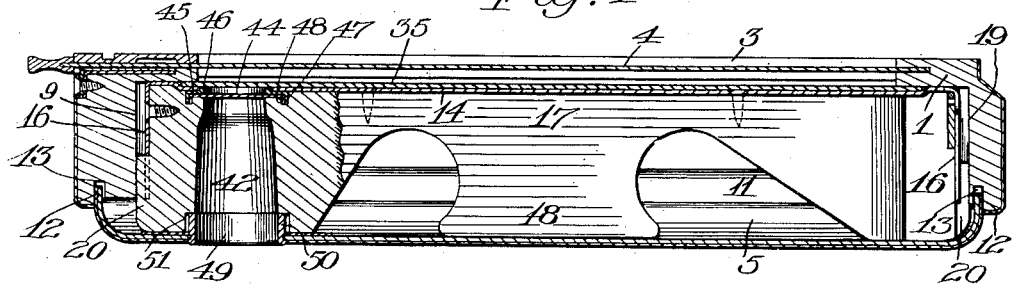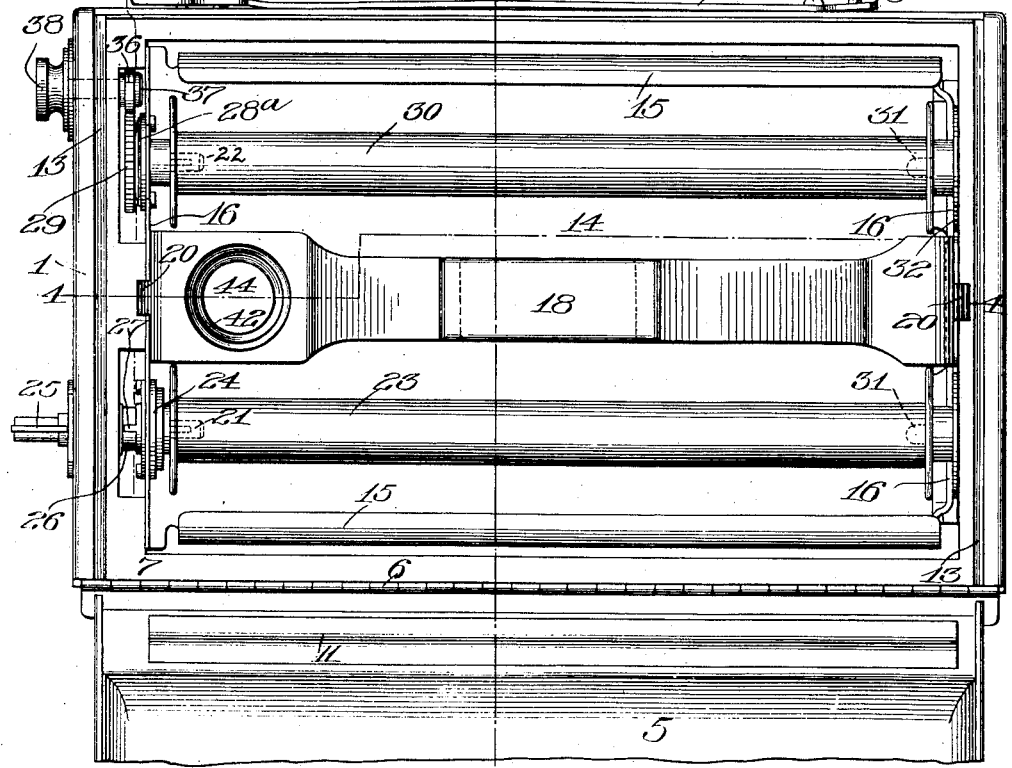

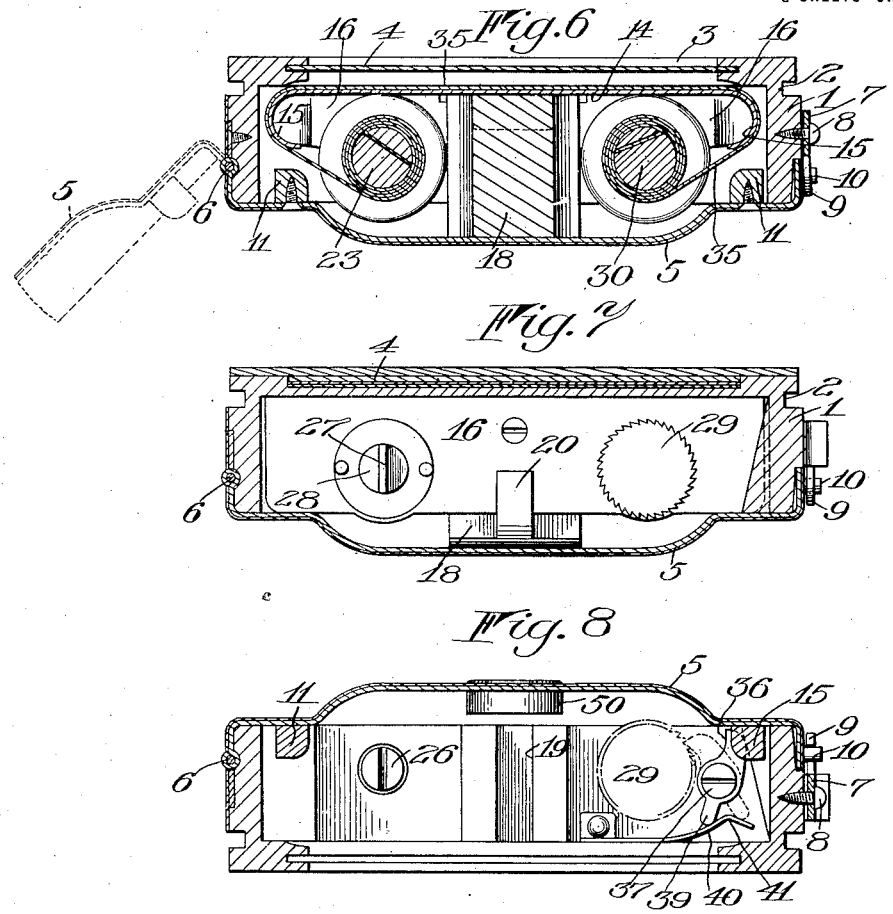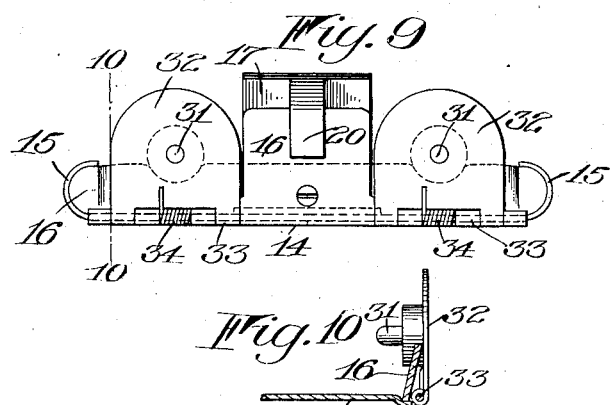

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-ROLL HOLDER.

1,187,895.  Specification of Letters Patent.  Patented June 20, 1916.

Application filed December 30, 1915. Serial No. 69,483.

*To all whom it may concern:*

Be it known that I, WILLIAM F. FOLMER, of Rochester, in the county of Monroe and State of New York, have invented certain new and useful Improvements in Photographic-Roll Holders; and I do hereby declare the following to be a full, clear, and exact description of the same, reference being had to the accompanying drawings, forming a part of this specification, and to the reference-numerals marked thereon.

My present invention relates to photography and more particularly to photographic roll holders of the kind adapted to be detachably held in position against a camera back to spread the film in the focal plane of the camera and the invention has for its object to provide a simple, cheap and convenient roll holder that will be light and compact and offer certain conveniences in its arrangements and mode of operation.

To these and other ends the invention resides in certain improvements and combinations of parts all as will be hereinafter more fully described, the novel features being pointed out in the claims at the end of the specification.

In the drawings: Figure 1 is a top or end view of a roll holder constructed in accordance with and illustrating one embodiment of my invention; Fig. 2 is a side view; Fig. 3 is a rear view; Fig. 4 is a section taken substantially on the lines 4—4 of Figs. 3 and 5; Fig. 5 is a rear view with the door cover open; Fig. 6 is a section taken substantially on the line 6—6 of Fig. 5; Fig. 7 is a section taken substantially on the line 7—7 of Fig. 5, looking toward the interior of the holder; Fig. 8 is a section on the same line as Fig. 7 looking toward the exterior of the holder; Fig. 9 is an end view of the inner roll carrying element, and Fig. 10 is a detail section taken substantially on the line 10—10 of Fig. 9.

Similar reference numerals throughout the several figures indicate the same parts.

The mode of attaching and using a holder of this kind is well known and hence the camera in connection with which it is used has not been illustrated.

Referring more particularly to the drawings, 1 indicates an outer frame or casing rabbeted at 2 for sliding attachment to the rear of the camera body. An exposure opening 3 in the front of the casing is normally closed by a removable sliding shutter 4 such as is usually provided in plate holders. At the rear, the casing is closed by a door 5 hinged at 6 on one side and secured in closed position at the other by a suitable fastening device such as the slotted bolt 7 (Fig. 2) guided on pins 8 and having locking fingers 9 coöperating with pins 10 on the door or cover. The latter has deep flanges on all four sides so that the hinged knuckle 6 and the swinging edge carrying the pins 10, both of which lie on the outside, come well below the rim of the casing frame 1 and effectively prevent the entrance of light. As an extra precaution, light sealing strips 11 are secured to the cover to parallel the flanges referred to on the inside of the casing. The end flanges 12 of the cover (Fig. 4) are received within rabbets 13 in the frame 1 to make light-tight joints along these edges.

Within the casing is removably contained a film support or backing board 14 that is removable rearwardly through the door 5 and rests against the front of the casing frame 1 opposite the exposure aperture 3. It is preferably composed of thin sheet metal with its side edges rolled as at 15 and provided with flanges 16 at its ends. Extending from end to end centrally of this film support is a body member 17 formed to constitute a handle or finger grip 18 by means of which the support is manipulated and inserted in and withdrawn from the casing through the door 5 together with the film rolls hereinafter described. At each end, the inner walls of the casing 1 are provided with guide slots 19 with which coöperate guiding ribs 20 formed on the ends of the body member 17 to center the latter and the film support within the casing.

The body member 17 forms a sort of a dividing wall between two film spool chambers within the casing in rear of the backing board or film support 14. At one end, the flanges 16 of the latter are rigid and form journals for two rotary film spool centers 21 and 22, the first mentioned of which is for the winding spool 23 (Fig. 5) and can be turned only in one direction through the use of the usual or any suitable clutch mechanism 24. While this center 21 is carried by the removable film support, it is turned by an exteriorly arranged key 25 carried by the casing 1 and having a slotted head 26 on the inside of the latter detachably interlocking with a rib 27 on a head 28 forming an extension of the center 21. The other center 22 is freely rotatable in both directions except for the resistance of a suitable tension spring 28 and terminates beyond the flange 16 in a ratchet wheel 29. This center 22 interlocks with the feed or supply spool 30 to turn therewith.

The opposite ends of both spools are journaled on idle centers 31. These are carried by leaves 32 (Figs. 9 and 10) hinged to the backing board or film support 14 at 33 and normally held in engaging position by springs 34. The spring action is stopped by the leaves engaging the adjacent flange 16 so that the centers 31 are held in the ends of the spools without bringing spring pressure to bear against the spools. When it is desired to insert or remove the spools, the whole inner element is removed from the casing 1 and the fixed centers 21 and 22 are first entered after which, by rocking outwardly the leaves 32, against the tension of the springs 34 and then allowing them to move inwardly again, the centers 31 are engaged.

The film 35 is fed from the supply spool 30 over the film support or back board 14 and around the rolled edges 15 onto the take-up spool 23, as usual, the portion lying against the support in rear of the exposure opening 3 being in position for exposure. In order that this stretch of film between the spools may be drawn taut, the ratchet wheel 29 is provided. Coöperating therewith is a pawl 36 pivoted at 37 on the end wall of the casing 1 and adapted to be turned by an exteriorly arranged knob 38 between the dotted line engaging position and the full line disengaged position of Fig. 8. A tail 39 on the pawl coöperates with a leaf spring 40 on the casing having a high point 41 over which the tail rides as the pawl is shifted so that the spring is adapted to hold it in either its engaged or disengaged position, as will be apparent. When the pawl is engaged it prevents further unwinding of the spool 30 and thereafter winding pressure on the key 25 will stretch the film between the spools and cause it to lie flat in the focal plane against the support 14. The pawl is disengaged when it is desired to wind a new length of film for the next exposure and is used only to stretch the film after it is in position. When the pawl is disengaged, it offers no obstruction to the removal of the inner element with which latter the ratchet 29 is carried away from it.

In order to provide the usual sight opening whereby the numbers or other designating marks on the film or its backing may be read from the rear of the holder, the body member 17 near one end is provided with a well 42 at the bottom of which is a registering opening 43 in the board 14 over which the film 35 passes. Spanning the opening 43 is a ruby window 44 that is held in place by a frame or ring 45 having a collar 46 extending into the opening 43 and an oppositely turned collar 47 let into a seat 48 in the body member 17. The walls of the well 42 are continuous from front to rear of the holder and are preferably painted white to reflect the light down so that the marks on the film may be plainly seen from the rear. The door 5 is also provided with an opening 49 in alinement with the well 42 and surrounded on the under side by a collar 50 that enters the well when the cover is closed and occupies a seat 51 at the mouth thereof, preventing the entrance of light to the film chambers from the vicinity of the well.

I claim as my invention:

1. In a photographic roll holder, the combination with a casing and a film supporting board therein removable through the back of the casing, of a body member fixed centrally to the rear of the film supporting board and formed to constitute a handle therefor and film spool supports at either side of the body member.

2. In a photographic roll holder, the combination with a casing and a film supporting board therein removable through the back of the casing, of a body member fixed centrally to the rear of the film supporting board and film spool supports at opposite sides of the body member, the body member and board being apertured to constitute a sight well having continuous walls extending from the rear through to the front of the holder.

3. In a photographic roll holder, the combination with a casing and a film supporting board therein removable through the back of the casing, of a body member fixed to the rear of the film supporting board, the body member and board being apertured to constitute a sight well having continuous walls extending from the rear through to the front of the holder, and a door at the back of the casing provided with an opening registering with the sight well and having a surrounding collar extending into the well to form a light seal.

4. In a photographic roll holder, the combination with a casing and a film supporting board therein removable through the back of the casing, the casing being provided with guides at opposite ends, of a body member fixed centrally to the rear of the film supporting board and having guiding members at its ends coöperating with the guides on the casing to center the film supporting board therein, said body member being formed to constitute a handle for manipulating the latter, and film spool supports on each side of the body member.

5. In a photographic roll holder, the combination with a casing, a film supporting board therein and removable film spool centering devices in rear of and carried with the board embodying a winding center for the take-up spool and a rotary support for the feed spool provided with a ratchet, of a pawl carried by and operable from the exterior of the casing to coöperate with the ratchet and lock the feed spool for the purpose of drawing the film taut across the film supporting board.

6. In a photographic roll holder, the combination with a casing, a film supporting board therein and film spool centering devices in rear of and carried with the board embodying a winding center for the take-up spool and a rotary support for the feed spool provided with a ratchet, of a pawl carried by and operable from the exterior of the casing to coöperate with the ratchet and lock the feed spool for the purpose of drawing the film taut across the film supporting board, and a two-way spring on the casing for holding the pawl in either its operative or inoperative position.

WILLIAM F. FOLMER.

Witnesses:
RUSSELL B. GRIFFITH,
AGNES NESBIT BISSELL.